(12) United States Patent
Takei

(10) Patent No.: US 7,083,521 B2
(45) Date of Patent: Aug. 1, 2006

(54) MOUNTING STRUCTURE OF SHAFT TO BE TESTED ON A BALANCER

(75) Inventor: Ryosuke Takei, Tochigi (JP)

(73) Assignee: Showa Corporation, Saitama (JP)

( * ) Notice: Subject to any disclaimer, the term of this patent is extended or adjusted under 35 U.S.C. 154(b) by 0 days.

(21) Appl. No.: 10/093,221

(22) Filed: Mar. 7, 2002

(65) Prior Publication Data

US 2003/0022720 A1 Jan. 30, 2003

(30) Foreign Application Priority Data

Jul. 27, 2001 (JP) .............................. 2001-228590

(51) Int. Cl.
*F16D 3/62* (2006.01)

(52) U.S. Cl. ............................ 464/69; 464/93; 73/460; 73/487

(58) Field of Classification Search .................. 464/68, 464/69, 93, 137; 73/460, 462, 468, 487
See application file for complete search history.

(56) References Cited

U.S. PATENT DOCUMENTS

| 562,498 | A | * | 6/1896 | Sperry | ...................... 464/69 X |
| 1,685,158 | A | * | 9/1928 | Gold | ............................ 464/69 |
| 2,449,654 | A | * | 9/1948 | Jessop | .......................... 464/93 |
| 4,182,139 | A | * | 1/1980 | Hornig et al. | ............. 464/69 X |
| 4,318,281 | A | * | 3/1982 | Cutler et al. | ................... 73/460 |
| 4,462,253 | A | * | 7/1984 | Becher | ......................... 73/487 |
| 4,724,708 | A | * | 2/1988 | Okano et al. | ................. 73/460 |
| 4,790,794 | A | * | 12/1988 | Takeda et al. | ................ 464/93 |
| 5,576,496 | A | * | 11/1996 | Carlini et al. | ................. 73/460 |
| 6,536,279 | B1 | * | 3/2003 | Berna | .......................... 73/462 |

* cited by examiner

*Primary Examiner*—Greg Binda
(74) *Attorney, Agent, or Firm*—Orum & Roth LLC

(57) ABSTRACT

A mounting structure of a shaft to be tested (the propeller shaft) to a balancer discloses: a centering shaft provided on a center axis of the mounting surface plate which can be fitted to a bearing provided on a center axis of the flexible coupling, wherein the flexible coupling and the mounting surface plate can be faucet connected by one of a plurality of bolt mounting portions provided at a plurality of positions in a peripheral direction of the flexible coupling.

1 Claim, 5 Drawing Sheets

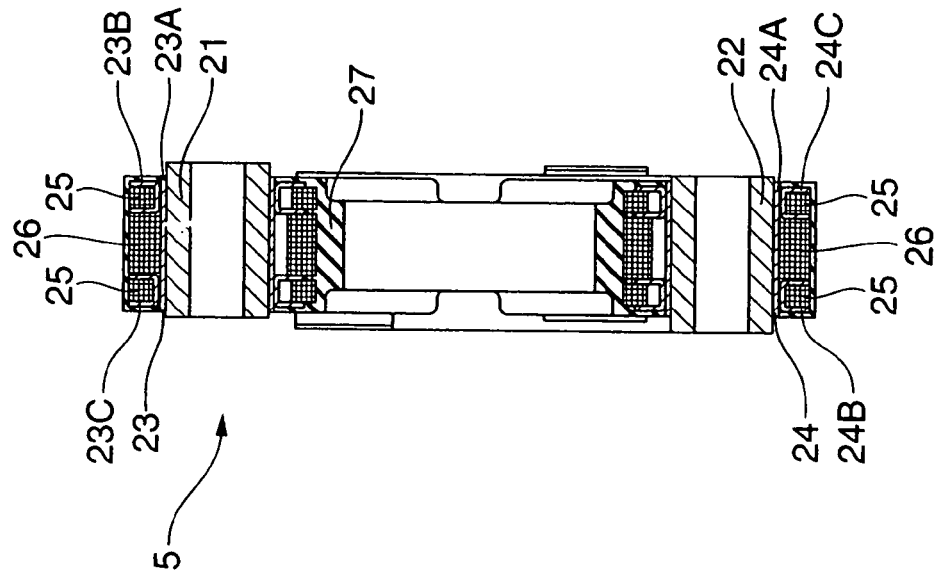
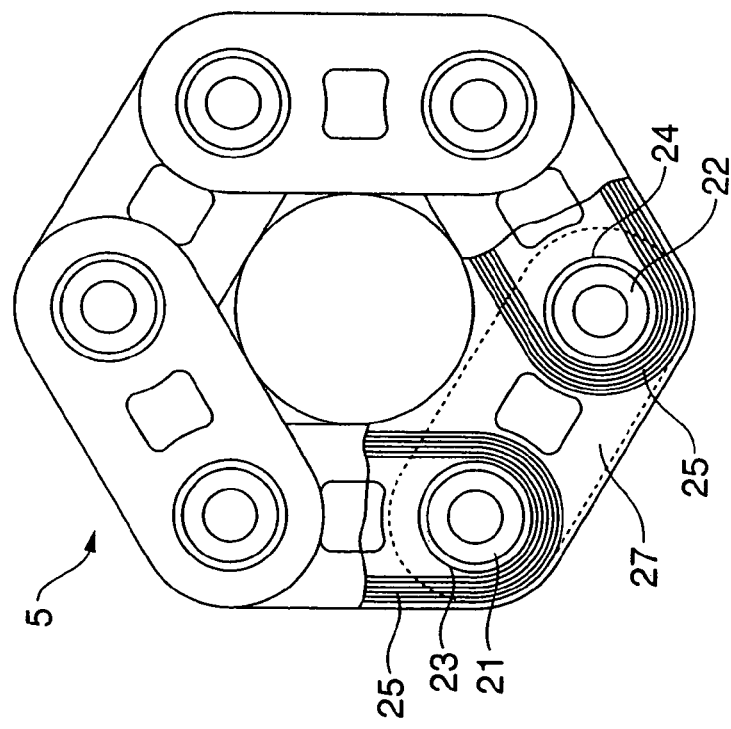

MOUNTING STRUCTURE OF SHAFT TO BE TESTED ON A BALANCER

BACKGROUND OF THE INVENTION

1. Field of the Invention

The present invention relates to the mounting structure of a shaft to be tested on a balancer.

2. Description of the Related Art

In a balance test performed on a shaft to be tested such as a propeller shaft or the like, a flexible coupling provided on an end portion of the tested shaft is mounted to a mounting surface plate of the balancer by a plurality of bolts.

In conventional art, a centering shaft provided on a center axis of the mounting surface plate is fitted to a bearing provided on a center axis of the flexible coupling. The flexible coupling is faucet connected to the mounting surface plate by all of a plurality of bolt mounting portions arranged in a plurality of positions in a peripheral direction of the flexible coupling. In particular, the flexible coupling is faucet connected to the mounting surface plate by fitting collars disposed in the respective bolt mounting portions of the flexible coupling to respective faucet recess portions provided in the mounting surface plate, fastened by bolts inserted through the collars to the mounting surface plate.

In the conventional art, since the collars provided in the flexible coupling are fitted to the faucet recess portions of the mounting surface plate in all of a plurality of bolt mounting portions provided at a plurality of positions in the peripheral direction of the flexible coupling, a slant of each of the collars and complications of an elastomer constituting the flexible coupling are easily generated due to any positioning error of the respective collars provided in the flexible coupling, and positioning error of the respective faucet recess portions provided in the mounting surface plate. Therefore, it is difficult to execute stable balancing.

SUMMARY OF THE INVENTION

The object of the present invention is to stably mount a flexible coupling fixed to a shaft to be tested, on a mounting surface plate of a balancer, so as to easily execute stable balancing.

According to the present invention, the mounting structure of a shaft to be tested to a balancer comprises: a flexible coupling provided on an end portion of the shaft to be tested, and a plurality of bolts mounting the flexible coupling to a mounting surface plate of the balancer.

A centering shaft which is provided on a center axis of the mounting surface plate can be fitted to a bearing provided on a center axis of the flexible coupling.

The flexible coupling and the mounting surface plate can be faucet connected by one of a plurality of bolt mounting portions provided at a plurality of positions in a peripheral direction of the flexible coupling.

BRIEF DESCRIPTION OF THE DRAWINGS

The present invention will be more fully understood from the detailed description given below and from the accompanying drawings which should not be taken to be a limitation on the invention, but are intended for explanation and understanding only.

The drawings

FIGS. 4A and 4B show the flexible coupling, in which FIG. 4A is a front elevational view and FIG. 4B is a cross sectional view.

DESCRIPTION OF THE PREFERRED EMBODIMENTS

Figure 1:
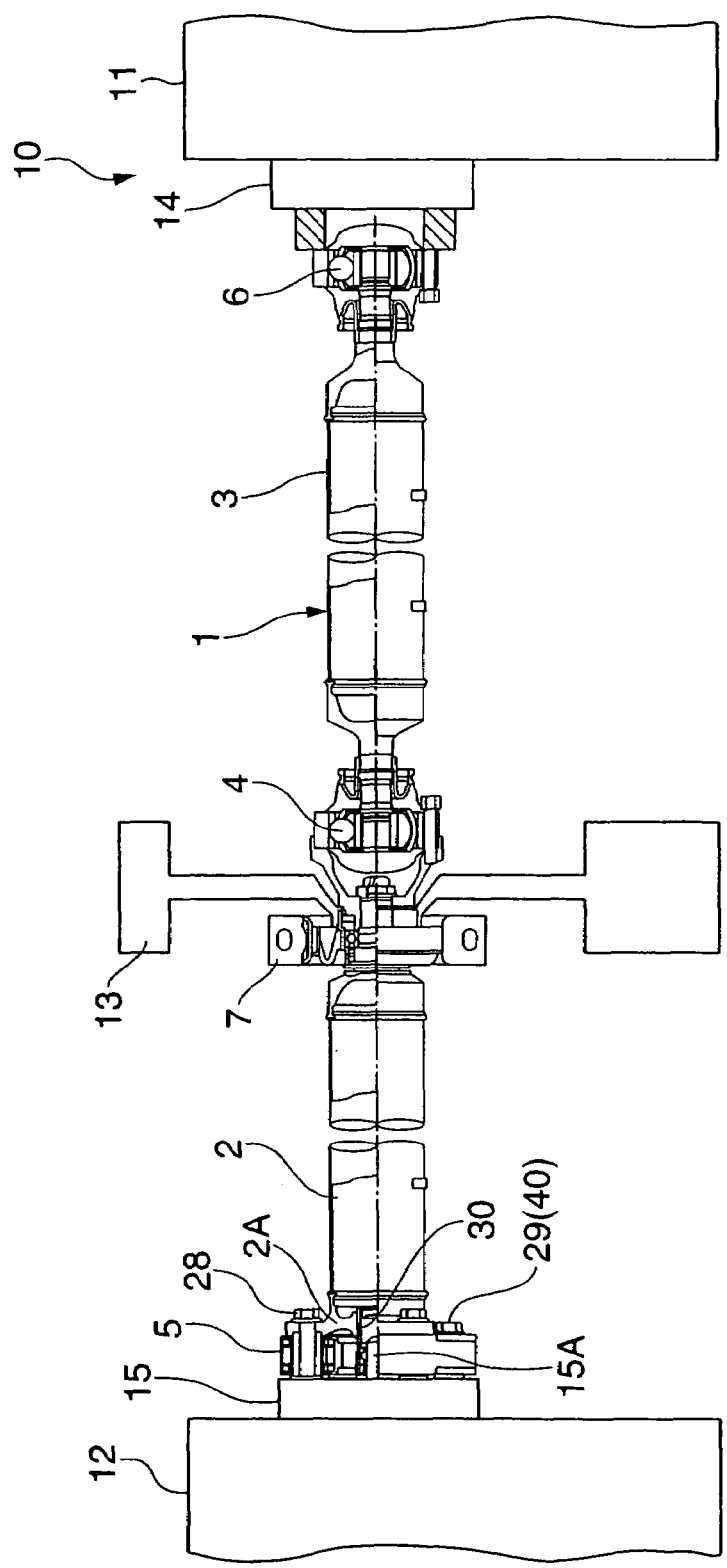
FIG. 1 is a front elevational view showing a balancer.

A balancer 10 sets out a propeller shaft 1 to a shaft to be tested so as to execute a balance test thereof, as shown in FIG. 1.

The propeller shaft 1 is provided with a universal joint 4 in a connecting portion between a front propeller shaft 2 and a rear propeller shaft 3, as shown in FIG. 1. It is provided with a flexible coupling 5 in an end portion of the front propeller shaft 2 corresponding to a transmission side. It is provided with a universal joint 6 in an end portion of the rear propeller shaft 3 corresponding to a differential gear side, and is provided with a center bearing 7 in the front propeller shaft 2.

The balancer 10 has a drive portion 11. It also has a floating portion 12 and an intermediate stand 13. The universal joint 6 of the propeller shaft 1 is mounted to a mounting surface plate 14 of the drive portion 11. The flexible coupling 5 of the propeller shaft 1 is mounted to a mounting surface plate 15 of the floating portion 12. The center bearing 7 of the propeller shaft 1 supports to the intermediate stand 13. The balancer 10 then executes a balance test of the propeller shaft 1.

A description will be given below of a structure mounting the flexible coupling 5 of the propeller shaft 1 to the mounting surface plate 15 provided at the floating portion 12 of the balancer 10.

In one embodiment, the flexible coupling 5 is structured, as shown in FIGS. 4A and 4B, such that drive side connecting collars 21 provided at a plurality of drive side bolt mounting portions, and driven side connecting collars 22 provided at driven side bolt mounting portions are alternately arranged in a circumferential direction. The drive side connecting collar 21 and the driven side connecting collar 22 which are adjacent in the circumferential direction are connected to each other by connecting bands 25 and 26. These are formed by a polyester fiber or the like wound around bobbin rings 23 and 24 attached to the outer peripheries thereof in a loop shape. The bobbin rings 23 and 24 and the connecting bands 25 and 26 are inserted into an elastomer 27 made of rubber, a synthetic resin, or the like.

In this case, the bobbin rings 23 and 24 are constituted by sleeves 23A and 24A and rings 23B, 23C, 24B and 24C having a C-like cross sectional shape, fixed to outer peripheral surfaces of both end portions in axial directions thereof. The connecting bands 25 are wound around the rings 23B and 23C of the bobbin rings 23 which are attached to the drive side connecting collars 21, and the rings 24B and 24C of the bobbin rings 24 which are attached to the driven side connecting collars 22. The connecting bands 26 are wound around a portion between rings 23B and 23C in the sleeves 23A of the bobbin rings 23 which are attached to the drive side connecting collars 21, and a portion between the rings 24B and 24C in the sleeves 24A of the bobbin rings 24 which are attached to the driven side connecting collars 22. The respective drive side connecting collars 21 and the respective driven side connecting collars 22 which are alternately arranged at a uniform interval in the circumferential direction are alternately connected in the circumferential direction by two connecting bands 25 and one connecting band 26.

The flexible coupling 5 is faucet connected to an end surface plate 2A of the front propeller shaft 2 by fitting the drive side connecting collars 21 disposed in a plurality of drive side bolt mounting portions to a faucet recess portion 2B disposed in the end surface plate 2A which is disposed on the front propeller shaft 2, constituting the propeller shaft 1. A nut 28A is fastened to a bolt 28 which is inserted to the front propeller shaft 2 and the drive side connecting collar 21, thereby creating a coaxial connection. The flexible coupling 5 inserts bolts 29 to the driven side connecting collars 22 provided in a plurality of driven side bolt mounting portions. The bolts 29 are engaged with a mounting surface plate 15 of the floating portion 12 in a manner mentioned below. Accordingly, a rotational torque of the propeller shaft 1, driven by the drive portion 11, is transmitted to the floating portion 12. A rotation transmission in a connected state accommodating slightly different directions of the axes of the propeller shaft 1 and the mounting surface plate 15 respectively is allowed due to deforming properties of the connecting bands 25 and 26 and the elastomer 27. Transmission vibrations between both the elements is thereby absorbed.

Figure 2:
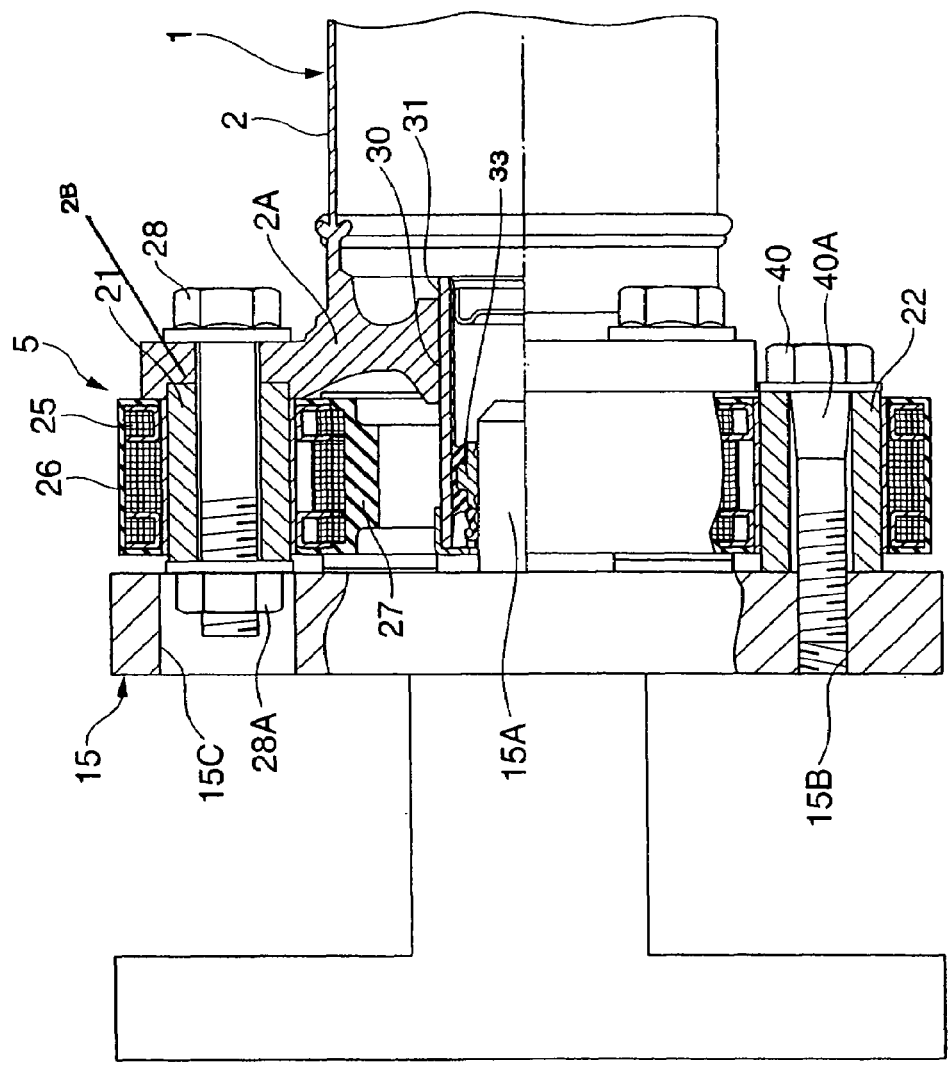
FIG. 2 is a cross sectional view showing a mounting structure of a flexible coupling to a mounting surface plate.
Figure 3:
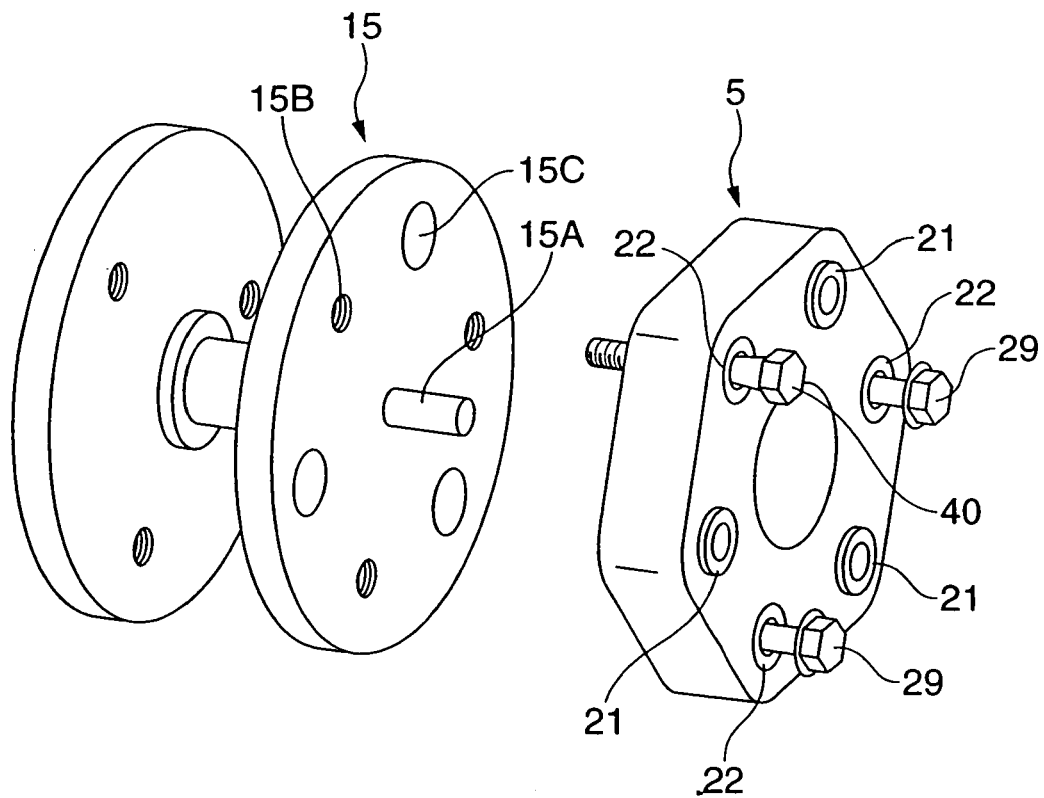
FIG. 3 is an expanded perspective view showing the flexible coupling and the mounting surface plate.

Accordingly, the flexible coupling 5 mounted to the end surface plate 2A of the front propeller shaft 2 is mounted to the mounting surface plate 15 of the floating portion 12 in the following manners (A) to (C) (FIGS. 2 and 3).

(D) A bearing 30 is coaxially connected to a center hole of the end surface plate 2A in the front propeller shaft 2 to which the flexible coupling 5 is mounted according to press fitting or the like. The bearing 30 is positioned on a center axis of the flexible coupling 5 coaxially connected to the end surface plate 2A of the front propeller shaft 2 in the manner mentioned above.

Figure 5:
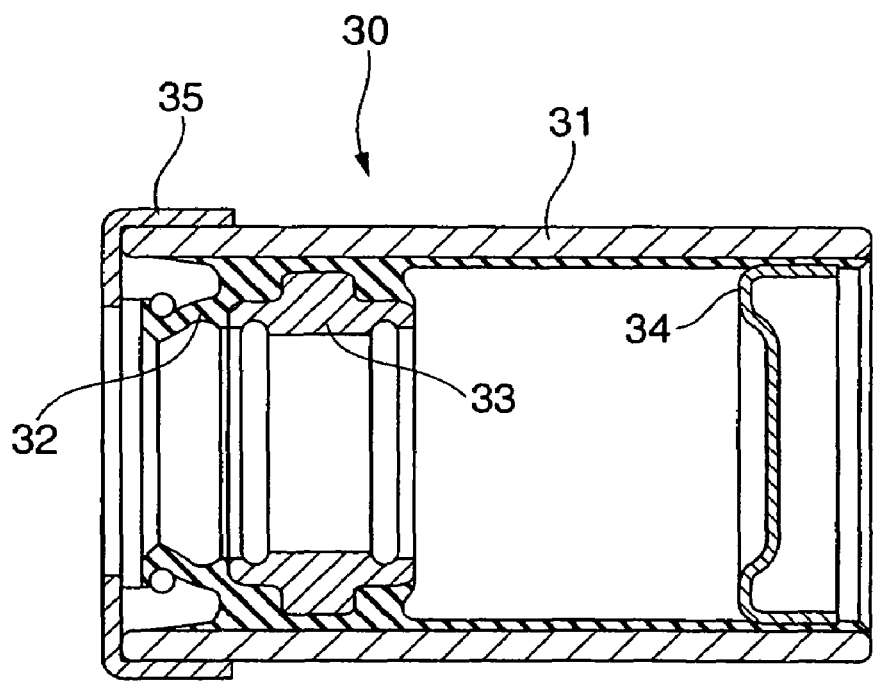
FIG. 5 is a cross sectional view showing a bearing provided in the flexible coupling.

In this case, the bearing 30 has an outer sleeve 31 fitted to the center hole of the flexible coupling 5, a rubber seal 32 vulcanized on an inner surface of the outer sleeve 31, an inner sleeve 33 provided on an inner periphery of the rubber seal 32, a cap 34 press fitted in to an inner peripheral end of the rubber seal 32, and a rib protecting cap 35 press fitted to an outer peripheral end of the outer sleeve 31, as shown in FIG. 5.

(E) A centering shaft 15A disposed on a center axis of the mounting surface plate 15 in the floating portion 12 is fitted to the bearing 30 mentioned in the item (A) positioned on the center axis of the flexible coupling 5, mounted to the end surface plate 2A of the front propeller shaft 2. The centering shaft 15A is closely attached to the rubber seal 32 of the bearing 30 so as to be fitted to the inner sleeve 33.

(F) The bolts 29 are inserted to the driven side connecting collars 22 disposed in a plurality of driven side bolt mounting portions which are disposed at a plurality of positions in the peripheral direction of the flexible coupling 5 in the manner mentioned above. The bolts 29 are engaged with female screw portions 15B provided in the mounting surface plate 15 of the floating portion 12. In one driven side bolt mounting portion, the flexible coupling 5 is faucet connected to the mounting surface plate 15 by a taper bolt 40, by inserting the taper bolt 40 to the driven side connecting collar 22 and engaging the taper bolt 40 with the female screw portion 15B of the mounting surface plate 15.

In this embodiment, the mounting surface plate 15 is provided with unloaded holes 15C for the bolts 28 and the nuts 28A mounting the flexible coupling 5 to the end surface plate 2A of the front propeller shaft 2 mentioned above.

According to the present embodiment, the following effects can be obtained.

1) It is possible to center the flexible coupling 5 to the mounting surface plate 15 by fitting the bearing 30 on the center axis of the flexible coupling 5 to the centering axis 15A of the mounting surface plate 15. It is possible to fix the flexible coupling 5 to the mounting surface plate 15 with no play in a rotational direction by faucet connecting the flexible coupling 5 to the mounting surface plate 15 by one of a plurality of bolt mounting portions of the flexible coupling 5, so that it is possible to coaxially connect the propeller shaft 1 to the balancer 10 with no play.

2) It is possible to faucet connect the flexible coupling 5 to the mounting surface plate 15 by one of a plurality of bolt mounting portions of the flexible coupling 5. It is possible to fasten them after adjusting the mounting positional relation of the flexible coupling 5 with respect to the mounting surface plate 15 in the other bolt mounting portions. It is thereby possible to stably mount the flexible coupling 5 to the mounting surface plate 15 without generating complications due to the elastomer 27 constituting the flexible coupling 5, or similar problems.

3) It is possible to easily faucet connect the flexible coupling 5 to the mounting surface plate 15 via a taper surface 40A of the taper bolt 40. This may be accomplished by inserting the taper bolt 40 to the connecting collar 22 disposed in the flexible coupling 5, and engaging the taper bolt 40 with the mounting surface plate 15, in one bolt mounting portion of the flexible coupling 5.

In this embodiment, according to the present invention, the structure may be made such that the flexible coupling 5 is faucet connected to the mounting surface plate 15 via the connecting collar 22. This may be accomplished by fitting the connecting collar 22 disposed in one bolt mounting portion of the flexible coupling 5 to the faucet recess portion provided in the mounting surface plate 15, and engaging the bolts 29 inserted to the connecting collar 22 with the mounting surface plate 15.

As heretofore explained, embodiments of the present invention have been described in detail with reference to the drawings. However, the specific configurations of the present invention are not limited to the embodiments, but those having a modification of the design within the range of the present invention are also included in the present invention. In this case, in the embodiments mentioned above, the present invention is shown on the basis of the mounting example between the flexible coupling and the floating portion side of the balancer. However, this may also be applied to the drive portion side.

As mentioned above, according to the present invention, it is possible to stably mount the flexible coupling fixed to the tested shaft to the mounting surface plate of the balancer, thereby producing stable balancing.

Although the invention has been illustrated and described with respect to several exemplary embodiments, it should be understood, by those skilled in the art, that the foregoing and various other changes, omissions and additions may be made to the present invention without departing from the spirit and scope thereof. Therefore, the present invention should not be understood as limited to the specific embodiment set out above, but should be understood to include all possible embodiments which can be embodied within a scope encompassed and equivalents thereof with respect to the features set out in the appended claims.

What is claimed is:

1. A mounting structure of a shaft to be tested on a balancer comprising:
   a flexible coupling provided at an end portion of the shaft to be tested;
   a plurality of bolts mounting the flexible coupling to a mounting surface plate of the balancer; and
   a centering shaft provided on a center axis of the mounting surface plate which is adapted to be fitted to a bearing provided on a center axis of the flexible coupling,
   the flexible coupling and the mounting surface plate being faucet connected at at least two of a plurality of bolt mounting portions provided at a plurality of positions in a circumferential direction of the flexible coupling, the faucet connections comprising differing first and second faucet type connections,
   the first faucet type connection comprises a single taper bolt inserted to a collar disposed at one of the bolt mounting portions in the flexible coupling and engaging the taper bolt with the mounting surface plate, a taper surface of the taper bolt co-acting with the connecting collar and the mounting surface plate so as to determine and fixedly position a driven side of the flexible coupling with respect to the mounting surface plate,
   the second faucet type connection comprises at least one collar disposed at another of the bolt mounting portions in the flexible coupling fitted to the mounting surface plate, a bolt being inserted to the collar and engaging the mounting surface plate, the second faucet type connection being arranged and constructed to fixedly position the driven side of the flexible coupling with respect to the mounting surface plate in a relative position determined by the first faucet type connection,
   wherein the relative position of the driven side of the flexible coupling with respect to the mounting surface plate is determined by the first faucet type connection, and this relative position is further secured by the second faucet type connection.

* * * * *